United States Patent Office 3,536,789
Patented Oct. 27, 1970

3,536,789
PHOSPHO-α-OXIMINO-CYANOPHENYL ACETIC ACID NITRILES
Walter Lorenz, Wuppertal-Vohwinkel, and Ingeborg Hammann, Cologne, Germany, assignors to Farbenfabriken Bayer Aktiengesellschaft, Leverkusen, Germany, a corporation of Germany
No Drawing. Filed June 16, 1967, Ser. No. 646,461
Claims priority, amendment of Sept. 29, 1966, application Germany, June 30, 1966, F 49,586
Int. Cl. C07f 9/06, 9/28; C01n 9/36
U.S. Cl. 260—940                                    9 Claims

ABSTRACT OF THE DISCLOSURE

α-[O-(alkyl or phenyl or cyclohexyl)-O-(alkyl)-phosphoryl- and -thionophosphoryl- and (alkyl or phenyl or cyclohexyl)-O-(alkyl)- -phosphonyl- and -thionophosphonyl-oximino] - α - [cyanophenyl] - acetic acid nitriles which possess pesticidal, especially acaricidal and insecticidal, properties and which may be produced by reacting the corresponding phosphoric-acid ester halide with the corresponding α-oximino-cyanophenyl acetic acid nitrile or salt.

---

The present invention relates to and has for its objects the provision for particular new phosphoric, phosphonic, thionophosphoric and thionophosphonic acid esters of α-oximinocyanophenyl acetic acid nitriles, i.e., phosphoryl, thionophosphoryl, phosphonyl and thionophosphonyl-α-oximino-cyanopheny acetic acid nitriles, which possess pesticidal, especially insecticidal and acaricidal, properties, active compositions in the form of mixtures of such compounds with solid and liquid dispersible carrier vehicles, and methods for producing such compounds and for using such compounds in a new way especially for combatting pests, e.g., arthropods, with other and further objects becoming apparent from a study of the within specification and accompanying examples.

It is already known that O,O-dialkyl-phosphoryloximines can be prepared by reacting geminal halo-nitro- or -nitroso-alkanes with O,O-O-trialkyl-phosphorous acid esters as in the following equation (cf. J. F. Allen, J. Am. Chem. Soc., vol. 79 (1957), page 3071):

(i)

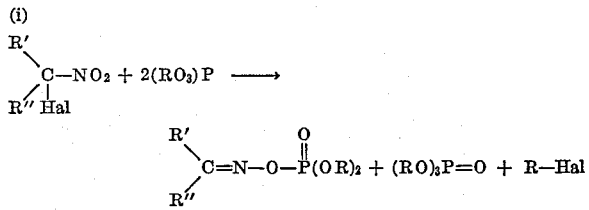

In the above Equation (i), R, R' and R" represent alkyl radicals, and Hal represents a halogen atoms, such as chlorine.

Furthermore, in a work by T. Mukaiyama and H. Nambu in J. Org. Chem. vol. 27 (1962), page 2201, the reaction of alkali metal salts of nitroalkanes (which contain the nitro group on a secondary carbon atom) with O,O-dialkyl-phosphorous acid ester chlorides to give O,O-dialkyl-phosphoryloximino-alkanes is described. The reaction proceeds according to the following equation:

(ii)

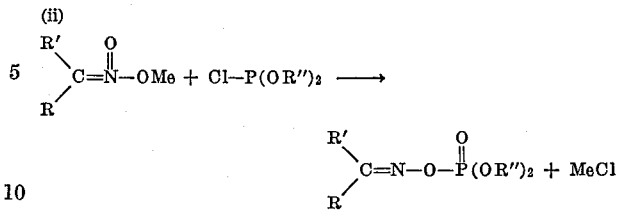

In the above Equation (ii), R, R' and R" represent alkyl radicals, and Me represents an alkali metal atom.

Moreover, from German Pat. 1,052,981, among others, the reaction of O,O-dialkyl-phosphoric or -thionophosphoric acid ester halides with oximes, preferably ketoximes, such as acetoxime, 4-chlor-acetophenone oxime or cyclohexanone oxime in the form of their alkali metal salts or in the presence of agents which bind hydrochloric acid, is known, which leads in the sense of the following equation to O,O-dialkyl-phosphoryl or -thionophosphoryl oximes:

(iii)

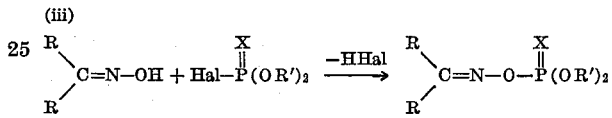

In the above Example (iii) one R thus represents methyl and the other R represents methyl or 4-chlorophenyl, or both the radicals R together with the adjacent methylidene group form the cyclohexane ring, R' represents an alkyl radical, X represents oxygen or sulfur, and Hal represents a halogen atom.

Finally, according to the particulars given in German Pat. 962,608, cyclic dicarboxylic acid hydroximides can be reacted in the form of their alkali metal salts or in the presence of acid-binding agents, such as the oximes of ketones, with O,O-dialkyl- -phosphoric or -thionophosphoric acid ester chlorides to give the corresponding N-(O,O-dialkyl- -phosphoryl or -thionophosphoryl) cyclic diacylimides, for example as shown by the following equation:

(iv)

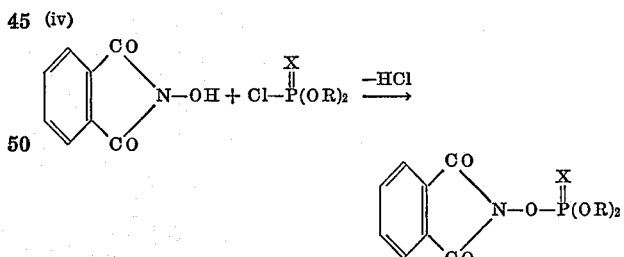

In the above Equation (iv), R represents an alkyl radical, and X represents oxygen or sulfur.

However, none of the methods of preparation known from the literature leads to phosphoric, phosphonic, thionophosphoric or thionophosphonic acid esters of α-oximino-cyanophenyl acetic acid nitriles, i.e., phosphoryl, thionophosphoryl, phosphonyl or thionophosphonyl α-oximino-cyanophenylacetic acid nitriles.

It has been found in accordance with the present invention that the particular new phosphoric, phosphonic, thionophosphoric and thionophosphonic acid esters of α-oximino-cyanophenyl acetic acid nitriles, i.e., phosphoryl, thionophosphoryl, phosphonyl, and thionophosphonyl -α- oximino-cyanophenyl acetic acid nitriles, of the formula

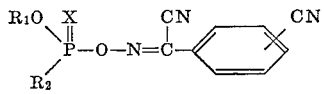   (I)

in which $R_1$ is alkyl having 1–4 carbon atoms, $R_2$ is selected from the group consisting of alkyl having 1–4 carbon atoms, alkoxy having 1–4 carbon atoms, phenyl, phenoxy, cyclohexyl, and cyclohexyloxy, and X is selected from the group consisting of oxygen and sulfur, exhibit strong pesticidal, especially insecticidal and acaricidal, properties.

It has been furthermore found in accordance with the present invention that a versatile and smooth process for the production of the particular new nitriles of Formula I above in favorable yields may be provided, which comprises reacting phosphoric, phosphonic, thionophosphoric or thionophosphonic acid ester halides of the formula:

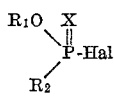   (IIa)

in which $R_1$ and $R_2$ are the same as defined above and Hal represents a halogen atom such as chloro, bromo, iodo, or fluoro, especially chloro or bromo, with α-oximino-cyanophenyl-acetic acid nitriles of the formula:

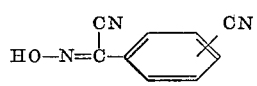   (IIb)

in the form of their salts or in the presence of acid-binding agents.

The course of the process for producing the particular new compounds of the invention is illustrated by the following reaction scheme:

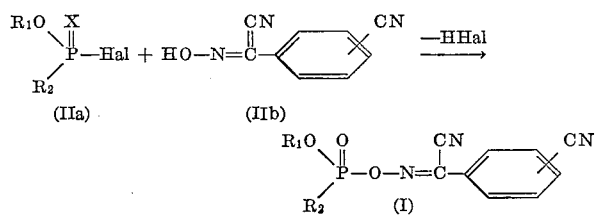

In the last-mentioned equation, the symbols $R_1$, $R_2$, X and Hal are the same as defined above.

The α-oximino starting compound required for the process of the present invention, for example α-oximino-2-cyanophenylacetic acid nitrile and its 4-isomer as well as the salts of these compounds, have not hitherto been described in the literature. Such precursor compounds, however, can be prepared according to known methods from the corresponding cyanobenzyl chlorides.

The reaction according to the instant process is preferably carried out in the presence of solvents. Good results have been obtained, particularly with organic solvents including low-boiling aliphatic ketones and nitriles, such as acetone, methylethyl-, methylisopropyl-, and methylisobutyl- ketone, acetonitrile and propionitrile, and also (optionally substituted) aromatic or aliphatic hydrocarbons, for example benzene, toluene, xylene, chlorobenzene, methylene chloride, chloroform, carbon tetrachloride, and mono-, di- and tri-chlor-ethylene. Finally, as far as the reactivity of the particular (thiono)- phosphoric (-phosphonic) acid ester halides concerned allows this, the reaction can also take place in water as solvent.

As already mentioned above, the production process according to the present invention may be carried out with the use of salts of α-oximinocyanophenylacetic acid nitriles. For this purpose there are suitable particularly the corresponding alkali metal salts (for example sodium, potassium, and lithium) and alkaline earth metal salts (for example calcium, strontium, and barium), and also heavy metal salts (for example silver). Instead of starting from these salts, it is also possible to use, with equally good results, the corresponding free α-oximino compounds as starting materials and to react these in the presence of acid-binding agents. As acid binding agents or acid acceptors there are suitable, in this regard, in particular alkali metal carbonates and alcoholates, such as potassium or sodium carbonate and potassium or sodium methylate and ethylate, and also tertiary amine bases, for example triethylamine, diethylaniline or pyridine.

The reaction for producing the compounds of the present invention may be carried out within a fairly wide temperature range. In general, the work is carried out at room temperature or slightly to moderately elevated temperature, and preferably at about 20 to 40° C. However, since the reaction proceeds in most cases with more or less strongly exothermic effect, it is often necessary, especially at the beginning of the reaction, to cool the mixture externally. Finally, it has proved expedient to stir the mixture (after combining the reactants) for a further longer period (½ to 3 hours or overnight) in order to complete the reaction, optionally with slight heating.

The products of the instant process are in most cases colorless to slightly yellow colored, water-insoluble oils which can be distilled in small amounts only, even under greatly reduced pressure, because they are sensitive to elevated temperatures for longer times. Some of the particular new substances are also obtained in the form of colorless, crystalline compounds which can readily be further purified by recrystallization from the usual solvents or solvent mixtures.

Surprisingly, the particular active compounds of the present invention, compared with the active compounds of analogous constitution and of the same type of activity which are known from the literature, are distinguished by a much better effectiveness, with considerably less toxicity in regard to warm-blooded animals as well as a comparatively low phytotoxicity. The instant compounds therefore represent a genuine enrichment of the art.

Advantageously, the particular new (thiono) phosphoric (-phosphone) acid esters which can be prepared according to the present process possess an outstanding, rapidly commencing biocidal, in particular insecticidal and acaricidal, effectiveness, in addition to an exceptionally low toxicity regarding warm-blooded animals. The instant products are therefore usable with success in plant protection for the control of noxious sucking and biting insects, Diptera and mites (Acarina).

To the sucking insects contemplated herein there belong, in the main, aphids (Aphidae) such as the green peach aphid (*Myzus persicae*), the bean aphid (*Doralis fabae*), the bird cherry aphid (*Rhopalosiphum padi.*), the pea aphid (*Macrosiphum psi*) and the potato aphid (*Macrosiphum solanifolii*), further the current gall aphid (*Cryptomyzus korschelti*), the mealy apple aphid (*Sappaphis mali*), the mealy pum aphin (*Hyalopterus arundinis*) and the cherry black-fly (*Myzus cerasi*); in addition, scales and mealybugs (Coccina), for example the oleander scale (*Aspidiotus hederae*) and the soft scale (*Lecanium hesperidum*) as well as the grape mealybug (*Pseudococcus maritimus*); thrips (*Thysanoptera*), such as *Hercinotrips femoralis*, and bugs, for example the beet bug (*Piesma quadrata*), the cotton bug (*Dysdercus intermedius*), the bed bug (*Cimex lectularius*), the assassin bug (*Rhodnius pyrolixus*) and Chagas' bug (*Triatoma infestans*) and, further, *cicades*, such as *Euscelis bilobatus* and *Nephotettix bipunctatus*; and the like.

In the case of the biting insects contemplated herein, there should be particularly mentioned butterfly caterpillars (*Lepidoptera*) such as the diamond-back moth (*Plutella maculipennis*), the gipsy moth (*Lymantria dispar*), the brown-tail moth (*Euproctis chrysorrhoea*) and tent caterpillar (*Malacosoma neustria*); further, the cabbage moth (*Mamestra brassicae*) and the cutworm (*Agrotis segetum*), the large white butterfly (*Pieris brassicae*), the small winter moth (*Cheimatobia brumata*), the green oak tortrix moth (*Tortrix viridana*), the fall armyworm (*Laphygma frugiperda*) and cotton worm (*Prodenia litura*), further the ermine moth (*Hyponemeuta padella*), the Mediterranean flour moth (*Ephestia Kuhniella*) and greater wax moth (*Galleria mellonella*). Also to be classed with the biting insects are beetles (*Coleoptera*), for example the granary weevil (*Sitophilus granarius-Calandra granaria*), the Colorado beetle (*Leptinotarsa decemlineata*), the dock beetle (*Gastrophysa viridula*), the mustard beetle (*Phaedon cochleariae*), the blossom beetle (*Melighethes aeneus*), the raspberry beetle (*Byturus tomentosus*), the bean weevil (*Bruchidius-Acanthoscelides obtectus*), the leather beetle (*Dermestes frischi*), the khapra beetle (*Trogoderma granarium*), the flour beetle (*Tribolium castaneum*), the northern corn billbug (*Calandra* or *Sitophilus zeamais*), the drugstore beetle (*Stegobium paniceum*), the yellow mealworm (*Tenebrio molitor*) and the sawtoothed grain beetle (*Oryzaephilus surinamensis*), but also species living in the soil, for example wireworms (*Agriotes spec.*) and larvae of the cockchafer (*Melolontha*); cockroaches, such as the German cockroach (*Blatella germanica*), American cockroach (*Periplaneta americana*), Madeira cockroach (*Laucophaea* or *Rhyparobia madeirae*), Oriental cockroach (*Blatta orientalis*), the giant cockroach (*Blaberus giganteus*) and the black giant cockroach (*Blaberus fuscus*) as well as *Henschoutedenia flexvitta*; further, *Orthoptera*, for example the house cricket (*Gryllus domesticus*); termites such as the eastern subterranean termite (*Reticulitermes flavipes*) and *Hymenoptera* such as ants, for example the garden ant (*Lasius niger*); and the like.

The *Diptera* contemplated herein comprise essentially the flies, such as the vinegar fly (*Drosophila melanogaster*), the Mediterranean fruit fly (*Ceratitis capitata*), the house fly (*Musca domestica*), the little house fly (*Fannia canicularis*), the black blow fly (*Phormia aegina*) and bluebottle fly (*Calliphora erythrocephala*) as well as the stable fly (*Stomoxys calcitrans*); further, gnats, for example mosquitoes such as the yellow fever mosquito (*Aedes aegypti*), the northern house mosquito (*Culex pipiens*) and the malaria mosquito (*Anopheles stephensi*), and the like.

With the mites (*Acarina*) contemplated herein there are classed, in particular, the spider mites (*Tetranychidae*), such as the two-spotted spider mite (*Tetranychus telarius-Tetranychus althaeae* or *Tetranychus urticae*) and the European red mite (*Paratetranychus pilosus-Panonychus ulmi*), blister mites, for example the current blister mite (*Eriophyes ribis*) and tarsonemids, for example the broad mite (*Hemitarsonemus latus*) and the cyclamen mite (*Tarsonemus pallidus*); finally, ticks, such as the relapsing fever tick (*Ornithodorus moubata*), and the like.

The active compounds according to the instant invention can be utilized, if desired, in the form of the usual formulations or compositions with dispersible carrier vehicles, such as solutions, emulsions, suspensions, emulsifiable concentrates, spray powders, pastes, soluble powders, dusting agents, granulates, etc. These are prepared in known manner, for instance by extending the active agents with dispersible liquid diluent carriers and/or dispersible solid carriers optionally with the use of carrier vehicle assistants, i.e., surface active agents, including emulsifying agents and/or dispersing agents, whereby, for example, in the case where water is used as diluent, organic solvents may be added as auxiliary solvents (cf. Agricultural Chemicals, March 1960, pages 35–38). The following may be chiefly considered for use as carrier vehicles for this purpose: dispersible liquid diluent carriers, such as aromatic hydrocarbons (for instance, benzene, toluene, xylene, etc.), halogenated, especially chlorinated, aromatic hydrocarbons (for instance, chlorobenzenes), paraffins (for instance, petroleum fractions), chlorinated aliphatic hydrocarbons (for instance, methylene chloride, etc.), alcohols (for instance, methanol, ethanol, propanol, butanol, etc.), ethers, ether-alcohols (for instance, glycol-monomethyl ether, etc.), amines (for instance, ethanolamine, etc.), amides( for instance, dimethyl formamide, etc.), ketones (for instance, acetone, etc.), and water; as well as dispersible finely divided solid carriers, such as natural ground minerals (for instance, kaolins, alumina, silica, chalk, i.e., calcium carbonate, talc, kieselguhr, etc.) and synthetic ground minerals (for instance, highly dispersed silicic acid, silicates, e.g., alkali silicates, etc.); whereas the following may be chiefly considered for use as carrier vehicle assistants for this purpose: emulsifying agents, such as non-ionic and anionic emulsifying agents (for instance, polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and dispersing agents, such as lignin, sulfite waste liquors, methyl cellulose, etc.

As will be appreciated by the artisan, the active compounds according to the instant invention may be present in such formulations or compositions in the form of mixtures with one another and with other known active substances, if desired.

The substances according to the invention may be employed by themselves as the artisan will appreciate, in the form of their compositions with solid or liquid dispersible carrier vehicles or other known compatible active agents, or in the form of particular dosage preparations for specific application made therefrom, such as solutions, emulsions, suspensions, powders, pastes, and granulates which are thus ready for use.

As concerns commercially marketed preparations, these generally contemplate carrier composition mixtures in which the active compound is present in an amount substantially between about 0.1–95% by weight, and preferably 0.5–90% by weight, of the mixture, whereas carrier composition mixtures suitable for direct application or field application generally contemplates those in which the active compound is present in an amount substantially between about 0.00001 and 20%, preferably 0.01 and 5%, by weight of the mixture. Thus, the present invention contemplates over-all compositions which comprise mixtures of a dispersible carrier vehicle such as a dispersible carrier solid, or a dispersible carrier liquid preferably including a carrier vehicle assistant, i.e., a surface active agent such as an emulsifying agent and/or a dispersing agent, and an amount of the active compound which is effective for the purpose in question and which is generally between about 0.00001 and 95% by weight, and preferably 0.00001 and 20% by weight, of the mixture.

In particular, the present invention contemplates methods of selectively controlling or combating pests, e.g., arthropods, i.e., insects and acarids, and more particularly, methods of combating at least one of insects and acarids which comprises applying to at least one of correspondingly (a) such insects, (b) such acarids, and (c) the corresponding habitat, a correspondingly combative amount, i.e., an arthropodicidally, especially insecticidally or acaricidally, effective amount, of the particular active compound of the invention alone or together with a carrier vehicle as noted above. The instant formulations or compositions are applied in the usual manner, for instance by spraying, atomizing, vaporizing, scattering, dusting, watering, sprinkling, pouring, and the like, whereby to apply the active compounds either to the plant parts themselves or to the vicinal soil itself, or both.

The unexpected superiority as well as the outstanding activity of the particular new compounds of the present invention when used against a multiplicity of pests and animal parasites can be seen from the following examples which are set forth by way of illustration and not limitation:

EXAMPLE 1

Phaedon test.—Solvent: 3 parts by weight acetone. Emulsifier: 1 part by weight alkylaryl polyglycol ether.

To produce a suitable preparation of the particular active compound, 1 part by weight of such active compound is mixed with the stated amount of solvent containing the stated amount of emulsifier, and the resulting concentrate is diluted with water to the desired final concentration.

Horse-radish leaves (*Cochlearia armoratia*) are sprayed with the preparation of the given active compound until dripping wet and then infested with horse-radish beetles (*Phaedon cochleariae*).

After the specified period of time, the degree of destruction is determined as a percentage: 100% means that all the beetles are killed: 0% means that none of the beetles are killed.

The active compounds, the concentrations of such active compounds, the evaluation time and the results can be seen from the following Table 1:

TABLE 1.—PLANT-DAMAGING INSECTS

| Active compound (formula) | | Concentration of active compound in percent | Degree of destruction in percent after 3 days |
|---|---|---|---|
| (A₁) | $(C_2H_5O)_2-\overset{S}{\underset{\parallel}{P}}-O-N=\overset{CH_3}{\underset{\mid}{C}}-\langle\text{phenyl}\rangle$ (known) | 0.1 | 20 |
| (III₁) | $(C_2H_5O)_2-\overset{S}{\underset{\parallel}{P}}-O-N=\overset{CN}{\underset{\mid}{C}}-\langle\text{phenyl}\rangle$ with CN | 0.1<br>0.01<br>0.001 | 100<br>100<br>30 |
| (IV₁) | $(C_2H_5O)_2-\overset{S}{\underset{\parallel}{P}}-O-N=\overset{CN}{\underset{\mid}{C}}-\langle\text{phenyl}\rangle-CN$ | 0.1<br>0.01<br>0.001 | 100<br>100<br>70 |

EXAMPLE 2

Myzus test. (contact action).—Solvent: 3 parts by weight acetone. Emulsifier: 1 part by weight alkylaryl polyglycol ether.

To produce a suitable preparation of the particular active compound, 1 part by weight of such active compound is mixed with the stated amount of solvent containing the stated amount of emulsifier and the resulting concentrate is diluted with water to the desired final concentration.

Cabbage plants (*Brassica oleracea*) which have been heavily infested with peach aphids (*Myzus persicae*) are sprayed with the preparation of the given active compound until dripping wet.

After the specified period of time the degree of destruction is determined as a percentage: 100% means that all the aphids are killed whereas 0% means that none of the aphids are killed.

The active compounds, the concentration of such active compounds, the evaluation time and the results can be seen from the following Table 2:

TABLE 2.—PLANT-DAMAGING INSECTS

| Active compound (formula) | | Concentration of active compound in percent | Degree of destruction in percent after 24 hours |
|---|---|---|---|
| (A₂) | $(C_2H_5O)_2-\overset{S}{\underset{\parallel}{P}}-O-N=\overset{CH_3}{\underset{\mid}{C}}-\langle\text{phenyl}\rangle$ (known) | 0.1 | 60 |
| (III₂) | $(C_2H_5O)_2-\overset{S}{\underset{\parallel}{P}}-O-N=\overset{CN}{\underset{\mid}{C}}-\langle\text{phenyl-CN}\rangle$ | 0.1<br>0.01<br>0.001 | 100<br>100<br>80 |

EXAMPLE 3

Tetranychus test.—Solvent: 3 parts by weight acetone. Emulsifier: 1 part by weight alkylaryl polyglycol ether.

To produce a suitable preparation of the particular active compound, 1 part by weight of such active compound is mixed with the stated amount of solvent containing the stated amount of emulsifier and the resulting concentrate is diluted with water to the desired final concentration.

Bean plants (*Phaseolus vulgaris*), which have a height of approximately 10–30 cm., are sprayed with the preparation of the given active compound until dripping wet. These bean plants are heavily infested with spider mites (*Tetranychus telarius*) in all stages of development.

After the specified period of time, the effectiveness of the preparation of the given active compound is determined by counting the dead mites. The degree of destruction thus obtained is expressed as a percentage: 100% means that all the spider mites are killed whereas 0% means that none of the spider mites are killed.

The active compound, the concentrations of such active compounds, the evaluation time and the results can be seen from the following Table 3:

TABLE 3.—PLANT-DAMAGING MITES

| Active compound (formula) | | Concentration of active compound in percent | Degree of destruction in percent after 2 days |
|---|---|---|---|
| ($A_3$) | $(C_2H_5O)_2-\overset{S}{\underset{\parallel}{P}}-O-N=\overset{CH_3}{\underset{\mid}{C}}-C_6H_5$ (known) | 0.1 | 50 |
| ($III_3$) | $(C_2H_5O)_2-\overset{S}{\underset{\parallel}{P}}-O-N=\overset{CN}{\underset{\mid}{C}}-C_6H_4-CN$ | 0.1 0.01 | 100 90 |
| ($IV_2$) | $(C_2H_5O)_2-\overset{S}{\underset{\parallel}{P}}-O-N=\overset{CN}{\underset{\mid}{C}}-C_6H_4-CN$ | 0.1 | 90 |

The following examples illustrate, without limitation, the process for producing the particular new compounds of the present invention:

EXAMPLE 4

($IV_3$)
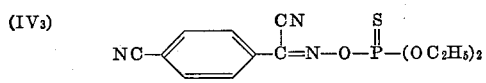

To a suspension of 28 g. (0.145 mol) of the sodium salt of a α-oximino-4-cyano-phenylacetic acid nitrile in 100 cc. acetone there are added dropwise 23 g. (0.124 mol) O,O-diethyl-thionophosphoric acid ester chloride. The temperature of the mixture increases to 35° C. The mixture is then further stirred for half an hour, taken up in benzene, and the benzene solution is washed with water and a 2 N solution of sodium hydroxide. Finally, washing is effected with water until there is a neutral reaction; the organic phase is dried over sodium sulfate, and the solvent is distilled off. There remain behind 32 g. (80% of the theory) of O,O-diethyl-thionophosphoryl-α-oximino-4-cyano-phenylacetic acid nitrile, i.e., α-(O,O-diethyl-thionophosphoryl-oximino)-α-(4-cyano-phenyl)-acetic acid nitrile, as viscous, dark-red oil with the refractive index $n^{23}$ 1.5569.

*Analysis.*—Calculated for a molecular weight of 323.3: N, 13.00%; 9.91%; P, 9.58%. Found: N, 12.75%; S, 9.88%; P, 9.52%.

EXAMPLE 5

($III_4$)
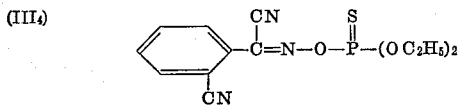

82 g. (0.425 mol) of the sodium salt of α-oximino-2-cyano-phenylacetic acid nitrile (M.P. 167° C. with decomposition) are suspended in 350 cc. acetone. To this suspension there are added dropwise, at 25 to 30° C., with cooling, 66 g. (0.35 mole) O,O-diethyl-thionophosphoric acid ester chloride and, after one hour's stirring, the mixture is poured into water. The separated oil solidifies in crystalline form. The crystals are filtered off with suction, washed with water and dissolved in ether. The minor portions which are insoluble in ether are filtered off with suction. The etheral solution is dried over sodium sulfate and, lastly, the solvent is distilled off. There remain behind 92 g. (81.5% of the theory) of O,O-diethyl-thionophosphoryl-α-oximino-2-cyano-phenylacetic acid nitrile, i.e., α-(O,O - diethyl - thionophosphoryl-oximino)-α-(2-cyanophenyl)-acetic acid nitrile, in the form of small, colorless needles of melting point 63 to 64° C.

*Analysis.*—Calculated for a molecular weight of 323.3; N, 13.10%; S, 9.91%; P, 9.58%. Found: N, 13.12%; S. 10.01%; P, 9.57%.

EXAMPLE 6

($V_1$)
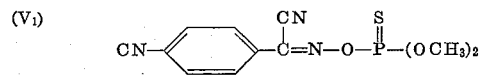

77 g. (0.45 mol) α-oximino-4-cyano-phenylacetic acid nitrile (M.P. 196° C.) are dissolved in 500 cc. acetone. After the addition of 80 g. (0.58 mol) potassium carbonate, the solution is stirred for half an hour at room temperature. 65 g. (0.405 mol) O,O-dimethyl-thionophosphoric acid ester chloride are then added dropwise at 25 to 30° C. with cooling and, after one hour's stirring, the reaction mixture is poured into water, and the oil which separates is taken up in benzene. The benzene solution is washed with water, and then twice with 2 N solution of sodium hydroxide and then again with water until there is a neutral reaction. The organic phase is subsequently dried over sodium sulfate and the solvent is distilled off. The oil which remains behind is triturated with petroleum ether; it solidifies completely in crystalline form. By recrystallization from isopropanol (1 g./3 cc.), O,O - dimethyl-thionophosphoryl-α-oximino-4-cyanophenyl-acetic acid nitrile, i.e., α-(O,O-dimethyl-thionophosphoryl-oximino)-α-(4-cyanophenyl)-acetic acid nitrile, is obtained in the form of a light-yellow granulate of melting point 81° C. The yield is 97 g. (99% of the theory).

*Analysis.*—Calculated for a molecular weight of 295.3: N, 14.23%; S, 10.85%; P, 10.49%. Found: N, 14.26%; S, 10.95%; P, 10.78%.

EXAMPLE 7

($VI_1$)
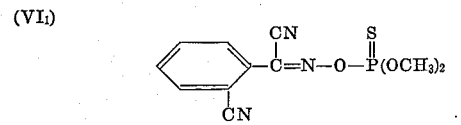

After the introduction (followed by stirring) at room temperature of 84 g. (0.6 mol) potassium carbonate into a solution of 93.5 g. (0.55 mol) α-oximino-2-cyano-phenyl-acetic acid nitrile (M.P. 167° C. with decomposition) in 500 cc. acetone, there are added dropwise, at 25 to 30° C., with cooling, 80.5 g. (0.5 mol) O,O-dimethyl-thionophosphoric acid ester chloride. The mixture is then stirred for a further hour, poured into water, and the separated oil is taken up in benzene. The benzene solution is washed with water and 2 N solution of sodium hydroxide. After further washing with water until there is a neutral reaction, the organic layer is dried over sodium sulfate, and the solvent is distilled off. The oil which remains behind solidifies immediately in crystalline form. Recrystallized from isopropanol (1 g./4 cc.), O,O-dimethyl-thionophosphoryl-α-oximino-2-cyanophenyl-acetic acid nitrile, i.e., α - (O,O-dimethyl-thionophosphoryl-oximino)-α-(2-cyanophenyl)-acetic acid nitrile, is obtained in the form of beige colored crystals, which melt at 94° C. The yield is 87 g. (58.8% of the theory).

*Analysis.*—Calculated for a molecular weight of 295.3: N, 14.23%; S, 10.85%; P, 10.49%. Found: N, 14.28%; S, 10.77%; P, 10.86%.

EXAMPLE 8

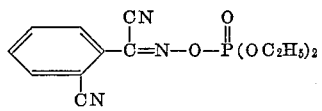

52 g. (0.27 mol) of the sodium salt of α-oximino-2-cyanophenylacetic acid nitrile are suspended in 300 cc. acetone. To this suspension, there are added dropwise, at 25 to 30° C., with cooling, 42 g. (0.245 mol) O,O-diethyl-phosphoric acid ester chloride. After half an hour's stirring at room temperature, the mixture is poured into water, and the separated oil is taken up in benzene. Working up of the reaction mixture takes place in the manner described in the preceding Example. The O,O-diethyl-phosphoryl-α-oximine-2-cyano - phenylacetic acid nitrile, i.e., α-(O,O-diethyl-phosphoryl-oximino) - α - (2-cyanophenyl)-acetic acid nitrile, is obtained in colorless crystals which, after recrystallization from an ether/petroleum ether mixture, melt at 67 to 68° C. The yield is 58 g. (77.5% of the theory).

*Analysis.*—Calculated for a molecular weight of 307.3: N, 13.67%; P, 10.08%. Found: N, 13.80%; P, 10.19%.

EXAMPLE 9

Using corresponding molar amounts of each of the following α-oximino-cyanophenyl acetic acid nitrile salts with each of the following phosphoric acid ester chlorides, respectively, in accordance with the procedure of Example 4:

(a) Phenyl-O-tert-butyl-thionophosphonic acid ester chloride and the sodium salt of α-oximino-4-cyano-phenyl acetic acid nitrile;

(b) Isobutyl-O-n-propyl-thionophosphonic acid ester chloride and the sodium salt of α-oximino-2-cyano-phenyl acetic acid nitrile;

(c) O,O-di-isopropyl-phosphoric acid ester chloride and the sodium salt of α-oximino-3-cyano-phenyl acetic acid nitrile;

(d) O-methyl-O-phenyl-thionophosphoric acid ester chloride and the sodium salt of α-oximino-3-cyano-phenyl acetic acid nitrile;

(e) O - isobutyl - O - cyclohexyl - phosphoric acid ester chloride and the sodium salt of α-oximino-2-cyano-phenyl acetic acid nitrile; and (f) cyclohexyl-O-methyl-phosphonic acid ester chloride and the sodium salt of α-oximino-4-cyano-phenyl acetic acid nitrile; the corresponding phosphoryl and phosphonyl oximino-cyanophenyl acetic acid nitriles are produced:

(a′) α-(phenyl - O - tert-butyl-thionophosphonyl-oximino)-α-(4-cyanophenyl)-acetic acid nitrile;

(b′) α-(isobutyl-O-n-propyl - thionophosphonyl - oximino)-α-(2-cyanophenyl)-acetic acid nitrile;

(c′) α-(O,O-di-isopropyl-phosphoryl-oximino) - α - (3-cyanophenyl)-acetic acid nitrile;

(d′) α-(O-methyl - O - phenyl-thionophosphoryl-oximino)-α-(3-cyanophenyl)-acetic acid nitrile;

(e′) α-(O-isobutyl-O-cyclohexyl-phosphoryl-oximino)-α-(2-cyanophenyl)-acetic acid nitrile; and (f′) α-(cyclohexyl-O-methyl-phosphonyl - oximino)-α-(4-cyanophenyl)-acetic acid nitrile.

Advantageously, in accordance with the present invention, in the foregoing formulae:

$R_1$ represents straight and branched alkyl having 1–4 carbon atoms, such as methyl, ethyl, n-propyl, iso-propyl, n-butyl, iso-butyl, sec.-butyl, and tert.-butyl, and especially methyl, ethyl, n- and iso- propyl, and n-, iso- and sec.-butyl;

$R_2$ represents alkyl having 1–4 carbon atoms, such as methyl to tert. butyl inclusive as noted for $R_1$; alkoxy having 1–4 carbon atoms, such as methoxy, ethoxy, n-propoxy, iso-propoxy, n-butoxy, iso-butoxy, sec.-butoxy, and tert.-butoxy; pehnyl, phenoxy; cyclohexyl, and cyclohexyloxy; and especially methoxy, ethoxy, n-propoxy, iso-propoxy, phenoxy, methyl, ethyl, n-propyl, iso-propyl, iso-butyl and phenyl, i.e., $C_{1-4}$ alkyl, $C_{1-3}$ alkoxy, phenyl and phenoxy; and X represents oxygen or sulfur, and especially sulfur, $R_2$ is preferably $C_{1-3}$ alkoxy and X is preferably sulfur. On the other hand, the cyano substituent on the phenyl moiety in accordance with Formula (I) is preferably in the 2- or 4-position of the phenyl nucleus.

It will be realized by the artisan that all of the foregoing compounds contemplated by the present invention possess the desired selective pesticidal, especially arthropodicidal, i.e., insecticidal or acaricidal, properties for combating insects and acarids, and that such compounds have not only a very slight toxicity toward warm-blooded creatures, but also a concomitantly low phytotoxicity.

It will be appreciated that as may be used herein, i.e., both in the specification and claims, the terms "arthropod," "arthropodicidal" and "arthopodicide" are defined as including specifically both insects and acarids within the contemplation of their meaning, for convenience in determining the collective aspects of utility herein. Thus, the insects and acarids may be considered herein collectively as arthropods to be combated collectively in accordance with the invention, and accordingly the insecticidal and/or acaricidal activity may be termed arthropodicidal activity, and the concomitant combative or effective amount used in accordance with the invention will be an arthropodicidally effective amount which in effect means an insecticidally or acaricidally effective amount of the active compound for the desired purposes.

It will be appreciated that the instant specification and examples are set forth by way of illustration and not limitation, and that various modifications and changes may be made without departing from the spirit and scope of the present invention.

What is claimed is:

1. Phospho-α-oximino-cyanophenyl acetic acid nitrile having the formula

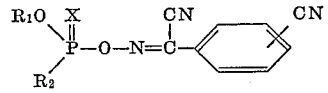

in which $R_1$ is alkyl having 1–4 carbon atoms, $R_2$ is selected from the group consisting of alkyl having 1–4 carbon atoms, alkoxy having 1–4 carbon atoms, phenyl, phenoxy, cyclohexyl, and cyclohexyloxy, and X is selected from the group consisting of oxygen and sulfur.

2. Nitrile according to claim 1 wherein $R_1$ is alkyl having 1–4 carbon atoms, $R_2$ is selected from the group consisting of alkyl having 1–4 carbon atoms, alkoxy having 1–3 carbon atoms, phenyl and phenoxy, and X is selected from the group consisting of oxygen and sulfur.

3. Nitrile according to claim 1 wherein $R_1$ is alkyl having 1–4 carbon atoms, $R_2$ is alkoxy having 1–3 carbon atoms, and X is selected from the group consisting of oxygen and sulfur.

4. Nitrile according to claim 1 wherein $R_1$ is alkyl having 1–4 carbon atoms, $R_2$ is alkoxy having 1–3 carbon atoms, X is sulfur, and the corresponding cyanophenyl moiety is selected from the group consisting of 2-cyanophenyl and 4-cyanophenyl.

5. Nitrile according to claim 1 wherein such compound is α-(O,O-diethyl-thionophosphoryl-oximino)-α-(2-cyanophenyl)-acetic acid nitrile having the formula

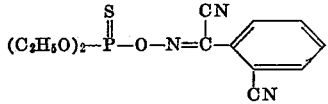

6. Nitrile according to claim 1 wherein such compound is α-(O,O-diethyl-thionophosphoryl-oximino)-α-(4-cyanophenyl)-acetic acid nitrile having the formula

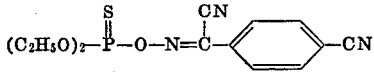

7. Nitrile according to claim 1 wherein such compound is α - (O,O - dimethyl-thionophosphoryl-oximino)-α-(4-cyanotphenyl)-acetic acid nitrile having the formula

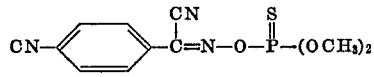

8. Nitrile according to claim 1 wherein such compound is α - (O,O - dimethyl-thionophosphoryl-oximino)-α-(2-cyanophenyl)-acetic acid nitrile having the formula

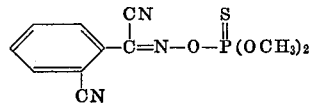

9. Nitrile according to claim 1 wherein such compound is α - (O,O - diethyl - phosphoryl-oximino)-α-(2-cyanophenyl)-acetic acid nitrile having the formula

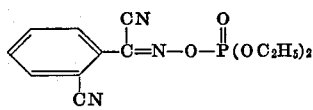

No references cited.

CHARLES B. PARKER, Primary Examiner
A. H. SUTTO, Assistant Examiner

U.S. Cl. X.R.
260—281, 971, 972; 424—210